(12) United States Patent
Zahn

(10) Patent No.: US 11,022,472 B2
(45) Date of Patent: Jun. 1, 2021

(54) COMBINATION OF FLUID LEVEL MEASUREMENTS FROM INDEPENDENT COMPARTMENTS WITH MAXIMUM REDUNDANCY

(71) Applicant: The Boeing Company, Chicago, IL (US)

(72) Inventor: Victor Zahn, Orange, CA (US)

(73) Assignee: The Boeing Company, Chicago, IL (US)

(*) Notice: Subject to any disclaimer, the term of this patent is extended or adjusted under 35 U.S.C. 154(b) by 265 days.

(21) Appl. No.: 15/828,429

(22) Filed: Nov. 30, 2017

(65) Prior Publication Data

US 2019/0162573 A1     May 30, 2019

(51) Int. Cl.
*G01F 23/00* (2006.01)
*B64D 37/00* (2006.01)
*B60K 15/03* (2006.01)

(52) U.S. Cl.
CPC ......... *G01F 23/0061* (2013.01); *B64D 37/00* (2013.01); *B64D 37/005* (2013.01); *G01F 23/0076* (2013.01); *B60K 2015/03118* (2013.01); *B60K 2015/03223* (2013.01); *B60Y 2400/3019* (2013.01)

(58) Field of Classification Search
CPC . G01F 23/0061; G01F 23/0076; B64D 37/00; B60Y 2400/3019; B60K 2015/03223; B60K 2015/03118
See application file for complete search history.

(56) References Cited

U.S. PATENT DOCUMENTS

| 5,207,099 A | 5/1993 | Baker |
| 5,513,527 A | 5/1996 | Griffiths |
| 6,157,894 A * | 12/2000 | Hess ...... B64D 37/00 702/141 |

FOREIGN PATENT DOCUMENTS

| WO | WO9932857 A1 | 7/1999 |
| WO | WO0235185 A2 | 5/2002 |

OTHER PUBLICATIONS

Heij et al.; "Econometric Methods with Applications in Business and Economics" Chapter 3 Multiple Regression, Section 3.1 "Linear Squares in Matrix Form;" Jun. 2004; 16 pages. http://global.oup.com/booksites/content/0199268010/samplesec3.
European Patent Office Extended Search Report, dated Apr. 5, 2019, regarding Application No. 18207884.0, 7 pages.

* cited by examiner

*Primary Examiner* — Matthew G Marini
(74) *Attorney, Agent, or Firm* — Yee & Associates, P.C.

(57) ABSTRACT

Estimating fluid related quantities of a first fluid compartment and a second fluid compartment disposed in or connected to a moveable platform. Measurements from the first fluid level sensor, the second fluid level sensor, the third fluid level sensor, the fourth fluid level sensor are combined into a unified calculation. The fluid related quantities are calculated from the unified calculation, the fluid related quantities comprising all of: (1) a fluid orientation estimate which is common to both the first fluid compartment and the second fluid compartment, (2) a first fluid height estimate for the first fluid compartment, and (3) a second fluid height estimate for the second fluid compartment, whereby (1), (2), and (3) form a set of results.

20 Claims, 14 Drawing Sheets

FIG. 7
{
FLUID PLANE EQUATION FOR EACH COMPARTMENT

$z = Px + Ry + C_i$ x, y, AND z ARE COORDINATES OF POINTS ON THE FLUID PLANE IN INCHES.
x POINTS FORWARD, y POINTS RIGHT AND z POINTS DOWN

P = PITCH FLUID PLANE COEFFICIENT IN RADIANS
R = ROLL FLUID PLANE COEFFICIENT IN RADIANS
$C_i$ = HEIGHT OF FLUID PLANE (INCHES) AT x=0, y=0 FOR THE $i_{th}$ COMPARTMENT

PITCH AND ROLL COEFFICIENTS ARE APPROXIMATELY EQUAL TO THE PITCH
AND ROLL OF THE AIRCRAFT ABOUT THE UPWARDLY POINTING FLUID PLANE
NORMAL IN RADIANS
}

800

802    804

FIG. 8
{
$$\begin{Vmatrix} z_1 = Px_1 + Ry_1 + C_1 \\ z_2 = Px_2 + Ry_2 + C_1 \\ z_3 = Px_3 + Ry_3 + C_1 \\ z_4 = Px_4 + Ry_4 + C_2 \\ z_5 = Px_5 + Ry_5 + C_2 \\ z_6 = Px_6 + Ry_6 + C_3 \\ z_7 = Px_7 + Ry_7 + C_3 \\ z_8 = Px_8 + Ry_8 + C_3 \\ z_9 = Px_9 + Ry_9 + C_3 \end{Vmatrix} \begin{bmatrix} z_1 \\ z_2 \\ z_3 \\ z_4 \\ z_5 \\ z_6 \\ z_7 \\ z_8 \\ z_9 \end{bmatrix} = \begin{bmatrix} x_1 & y_1 & 1 & 0 & 0 \\ x_2 & y_2 & 1 & 0 & 0 \\ x_3 & y_3 & 1 & 0 & 0 \\ x_4 & y_4 & 0 & 1 & 0 \\ x_5 & y_5 & 0 & 1 & 0 \\ x_6 & y_6 & 0 & 0 & 1 \\ x_7 & y_7 & 0 & 0 & 1 \\ x_8 & y_8 & 0 & 0 & 1 \\ x_9 & y_9 & 0 & 0 & 1 \end{bmatrix} \begin{bmatrix} P \\ R \\ C_1 \\ C_2 \\ C_3 \end{bmatrix}$$

806 ⟶ b  =  A ⟵ 808   x ⟵ 810
}

FIG. 9
RELATIONSHIP BETWEEN A MATRIX, b, AND ERROR VECTOR: THE STARTING POINT FOR LEAST SQUARES FORMULATION $b = Ax + e$ $b$ = COLUMN VECTOR OF FLUID PLANE z COORDINATES FROM EACH PROBE USED $A$ = MATRIX WITH ROWS COMPOSED OF x, y COORDINATES FROM EACH PROBE USED AND VECTOR CONTAINING A SINGLE 1.0 WITH THE REST ZEROS. THE "1.0" ENTRY SPECIFIES WHICH COMPARTMENT'S FUEL PLANE HEIGHT APPLIES TO THE ROW $x$ = COLUMN VECTOR OF QUANTITIES TO BE ESTIMATED, PITCH, ROLL, AND PLANE HEIGHTS FOR EACH COMPARTMENT $e$ = ERROR VECTOR WHICH IS THE DIFFERENCE BETWEEN OBSERVED b AND THE Ax MODEL. THIS IS CAUSED BY SLOSH AND MEASUREMENT ERRORS. THIS IS WHAT CAUSES AN IMPERFECT FIT. THERE IS NO STATISTICAL DISTRIBUTION ASSUMED

FIG. 10
LEAST SQUARES IN MATRIX FORM

LEAST SQUARES SOLUTION (xls) MINIMIZES THE SUM OF THE RESIDUAL COMPONENTS SQUARED INDEPENDENT OF ANY ASSUMPTIONS ABOUT THE ERRORS $xls = (A^t A)^{-1} A^t b$    (LEAST SQUARE ESTIMATE)

$r = b - (A)xls$    (RESIDUAL VECTOR)

$rsumsq = \Sigma (r_i)^2$    (SUM OF THE SQUARES OF THE RESIDUAL COMPONENTS)

THE BETTER THE MEASUREMENTS "FIT" A PLANE, THE SMALLER rsumsq WILL BE. GOODNESS OF FIT IS INFLUENCED BY FLUID PLANE STABILITY AND MEASUREMENT ERRORS. THE LEAST SQUARES ESTIMATE WILL STILL MINIMIZE THE SUM OF THE SQUARES OF THE RESIDUAL COMPONENTS (rsumsq), EVEN IF THE FIT ISN'T GOOD DUE TO NUMERICAL INSTABILITY OF THE xls EQUATION ABOVE, THE ALGORITHM USES QR FACTORIZATION TO SOLVE AN EQUIVALENT SYSTEM WHICH IS MORE NUMERICALLY STABLE

$$nsigma_i = \frac{|r_i|}{\sqrt{\Sigma r_i^2 / REDUNDANCY}} > 0.8$$

FIG. 12
$$\begin{cases} \sigma_{err}^2 = \dfrac{\Sigma r_i^2}{0.4} \\ \text{covariance}(xls) = \sigma_{err}^2 (A^T A)^{-1} \\ \sigma_{pitch} = (180/pi)\sqrt{[\text{covariance}(xls)]_{11}} < 2 \text{ DEGREES} \\ \sigma_{roll} = (180/pi)\sqrt{[\text{covariance}(xls)]_{22}} < 2 \text{ DEGREES} \end{cases}$$

LINEARITY CHECK

THE x's AND y's ARE FROM THE A MATRIX IN FIGURE 8. THE m AND b ARE THE SLOPE AND y INTERCEPT OF THE BEST FIT LINE CONNECTING THE MEASUREMENT PROBES $$x_1 = my_1 + b$$
$$x_2 = my_2 + b$$
$$x_3 = my_3 + b$$
$$x_4 = my_4 + b$$
$$x_5 = my_5 + b$$
$$x_6 = my_6 + b$$
$$x_7 = my_7 + b$$
$$x_8 = my_8 + b$$
$$x_9 = my_9 + b$$

$$\begin{bmatrix} x_1 \\ x_2 \\ x_3 \\ x_4 \\ x_5 \\ x_6 \\ x_7 \\ x_8 \\ x_9 \end{bmatrix} = \begin{bmatrix} y_1 & 1 \\ y_2 & 1 \\ y_3 & 1 \\ y_4 & 1 \\ y_5 & 1 \\ y_6 & 1 \\ y_7 & 1 \\ y_8 & 1 \\ y_9 & 1 \end{bmatrix} \begin{bmatrix} m \\ b \end{bmatrix}$$

blin = Alin    Xlin

PERFORM LEAST SQUARES CALCULATION ON THE MATRICES ABOVE AND OBTAIN THE RESIDUAL. THE LARGEST RESIDUAL COMPONENT ($R_{max}$) AND THE DIFFERENCE BETWEEN THE MAXIMUM AND MINIMUM y COORDINATES OF THE PROBES (L) ARE USED TO DETERMINE THE NonLinearityAngle. THE BIGGER THE NonLinearityAngle IS, THE BETTER CONDITIONED THE A MATRIX IS FOR THE LEAST SQUARES CALCULATION. THIS IS A BOUND ON HOW CLOSE THE PROBES ARE FROM LYING ON A LINE. IF THE PROBES ALL LIE ON A LINE THEN THE LEAST SQUARES CALCULATION CANNOT BE PERFORMED. THIS SERVES AS A "POOR MAN'S" MATRIX CONDITION NUMBER THAT IS VERY EFFICIENT TO CALCULATE. THE PRECISION OF THE CALCULATIONS WILL DETERMINE HOW SMALL THIS ANGLE CAN BE $$\text{NonLinearityAngle} = \dfrac{\sqrt{2}}{L} R_{max}$$

| A = | | | | | | | b = | xls = | r = |
|---|---|---|---|---|---|---|---|---|---|
| 932.5690 | -474.3070 | 1 | 0 | 0 | 0 | 0 | 294.0140 | 0.0541 | -0.6293 |
| 911.4720 | -406.9420 | 1 | 0 | 0 | 0 | 0 | 293.9880 | -0.0021 | 0.6293 |
| 899.5520 | -356.3130 | 0 | 1 | 0 | 0 | 0 | 299.7100 | 243.1868 | 1.5628 |
| 903.9560 | -285.5770 | 0 | 1 | 0 | 0 | 0 | 297.7680 | 248.7278 | -0.4670 |
| 877.5770 | -216.1860 | 0 | 1 | 0 | 0 | 0 | 295.7650 | 248.2136 | -0.8954 |
| 835.3890 | -157.4620 | 0 | 1 | 0 | 0 | 0 | 294.0530 | 246.1707 | -0.2004 |
| 835.9880 | 157.1850 | 0 | 0 | 1 | 0 | 0 | 292.6440 | 238.4189 | -0.4585 |
| 878.3130 | 215.8570 | 0 | 0 | 1 | 0 | 0 | 294.2390 | | -1.0283 |
| 904.7920 | 285.2090 | 0 | 0 | 1 | 0 | 0 | 296.1320 | | -0.4202 |
| 900.4150 | 355.9370 | 0 | 0 | 1 | 0 | 0 | 298.0720 | | 1.9070 |
| 910.6890 | 407.3180 | 0 | 0 | 0 | 1 | 0 | 296.1960 | | 1.6274 |
| 932.5810 | 474.3010 | 0 | 0 | 0 | 1 | 0 | 293.9830 | | -1.6274 |
| 864.9360 | 89.8930 | 0 | 0 | 0 | 0 | 1 | 284.1970 | | -0.8199 |
| 825.9030 | 89.9960 | 0 | 0 | 0 | 0 | 1 | 283.7250 | | 0.8199 |

FIG. 14

$$Q = \begin{bmatrix}
-0.2809 & -0.4185 & 0.4974 & 0.0850 & 0.0099 & 0.1268 & 0.1186 \\
-0.2745 & -0.3604 & 0.5442 & -0.0850 & -0.0099 & -0.1268 & -0.1186 \\
-0.2709 & -0.3167 & -0.3813 & 0.0754 & 0.0249 & 0.3849 & 0.2233 \\
-0.2723 & -0.2560 & -0.3366 & -0.0825 & 0.0160 & 0.1201 & 0.2874 \\
-0.2643 & -0.1961 & -0.2876 & -0.2612 & -0.0065 & -0.1413 & -0.0117 \\
-0.2516 & -0.1452 & -0.2427 & -0.4279 & -0.0344 & -0.3636 & -0.4990 \\
-0.2518 & 0.1252 & -0.0407 & 0.2916 & -0.3586 & 0.3587 & -0.5341 \\
-0.2645 & 0.1751 & -0.0101 & 0.1908 & -0.3488 & 0.1411 & -0.0249 \\
-0.2725 & 0.2343 & 0.0299 & 0.0533 & -0.3478 & -0.1173 & 0.2992 \\
-0.2712 & 0.2951 & 0.0761 & -0.1114 & -0.3607 & -0.3826 & 0.2598 \\
-0.2743 & 0.3392 & 0.1074 & -0.2205 & 0.3422 & 0.3923 & -0.1348 \\
-0.2809 & 0.3964 & 0.1467 & -0.3562 & 0.3415 & 0.1425 & 0.1348 \\
-0.2605 & 0.0670 & -0.0888 & 0.4676 & 0.3710 & -0.2904 & 0.1803 \\
-0.2488 & 0.0676 & -0.0821 & 0.4370 & 0.3536 & -0.2929 & -0.2800
\end{bmatrix}$$

$$R = 1.0e+003 * \begin{bmatrix}
-3.3202 & -0.0457 & -0.0006 & -0.0011 & -0.0011 & -0.0006 & -0.0005 \\
0 & 1.1640 & -0.0008 & -0.0009 & 0.0008 & 0.0007 & 0.0001 \\
0 & 0 & 0.0010 & -0.0012 & 0.0001 & 0.0003 & -0.0002 \\
0 & 0 & 0 & -0.0007 & 0.0004 & -0.0006 & 0.0009 \\
0 & 0 & 0 & 0 & -0.0014 & 0.0007 & 0.0007 \\
0 & 0 & 0 & 0 & 0 & 0.0005 & -0.0006 \\
0 & 0 & 0 & 0 & 0 & 0 & -0.0001
\end{bmatrix}$$

COMBINATION OF FLUID LEVEL MEASUREMENTS FROM INDEPENDENT COMPARTMENTS WITH MAXIMUM REDUNDANCY

BACKGROUND INFORMATION

1. Field

The present disclosure relates to combining fluid level measurements from independent compartments with maximum redundancy, and more particularly relates to the combination of fluid level measurements from independent compartments in a moveable platform, such as an aircraft.

2. Background

Moveable platforms, such as but not limited to aircraft, may contain multiple fluid tanks. For example, an airplane may contain two or more fuel tanks, or a boat may have two or more fluid storage tanks. Even buildings can be considered "moveable platforms," as certain buildings may be designed to sway when subject to a wind or to an earthquake.

Often an operator of the moveable platform desires to know fluid related quantities in the fluid tanks, such as but not limited to fluid orientation, fluid mass, fluid level within the fluid tank, and possibly other fluid related quantities. However, because the moveable platform may change its orientation and be accelerating, such as an airplane in dynamic flight or a building swaying, sensing these fluid related quantiles or determining the fluid related quantities from fluid level measurements can be difficult or subject to error. Errors in fluid measurements may arise as a result of sensor errors or fluid slosh.

SUMMARY

The illustrative embodiments provide for a method of estimating fluid related quantities of a first fluid compartment and a second fluid compartment disposed in or connected to a moveable platform, wherein the first fluid compartment is independent of the second fluid compartment, wherein the first fluid compartment has disposed therein a first fluid level sensor and a second fluid level sensor, and wherein the second fluid compartment has disposed therein a third fluid level sensor and a fourth fluid level sensor. The method includes combining, by a processor, measurements from the first fluid level sensor, the second fluid level sensor, the third fluid level sensor, and the fourth fluid level sensor into a unified calculation. The method also includes calculating, by the processor, the fluid related quantities from the unified calculation, the fluid related quantities comprising all of: (1) a fluid orientation estimate which is common to both the first fluid compartment and the second fluid compartment, (2) a first fluid height estimate for the first fluid compartment, and (3) a second fluid height estimate for the second fluid compartment, whereby (1), (2), and (3) form a set of results.

The illustrative embodiments also provide for a method of estimating fluid related quantities of a first fluid compartment and a second fluid compartment disposed in or connected to a moveable platform, wherein the first fluid compartment is independent of the second fluid compartment, wherein the first fluid compartment has disposed therein a first fluid level sensor and a second fluid level sensor, wherein the second fluid compartment has disposed therein a third fluid level sensor and a fourth fluid level sensor, and wherein at least one additional fluid level sensor is in either the first fluid compartment or the second fluid compartment. The method includes combining, by a processor, measurements from the first fluid level sensor, the second fluid level sensor, the third fluid level sensor, the fourth fluid level sensor and the additional fluid level sensors into a first unified calculation. The method also includes calculating by the processor, using the first unified calculation, all of (1) a first fluid orientation estimate which is common to both compartments and (2) a first fluid height estimate for the first compartment, and (3) a first fluid height estimate for the second compartment, whereby (1), (2), and (3) form a first set of results. The method also includes, responsive to determining if outlier data exists, rejecting, by the processor, outlier measurements from any sensor that produces the outlier data, but retaining remaining measurements from remaining non-outlier sensors, whereby revised data is formed. The method also includes responsive only to there being enough non-outlier measurements, combining, by the processor, the revised data into a second unified calculation. The method also includes, responsive only to there being enough non-outlier measurements, calculating by the processor, using the second unified calculation, all of (4) a second fluid orientation estimate which is common to both compartments and (5) a second fluid height estimate for the first compartment, and (6) a second fluid height estimate for the second compartment, whereby (4), (5), and (6) form a second set of results.

The illustrative embodiments also provide for an aircraft including a fuselage and an onboard computer programmed with program code for performing the above-described method. The illustrative embodiments also provide for a non-transitory computer-recordable storage medium storing program code, which when executed by a computer, whether onboard or off-board an aircraft, performs the above-described method.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 7 is an illustration of the fluid plane equation (in this case the fluid is fuel) which specifies a plane that each point on the fluid surface would lie on if the fluid was completely settled (i.e. no slosh), in accordance with an illustrative embodiment;

FIG. 8 is an illustration of a system of equations used for performing fuel plane pitch and roll determinations using least squares for nine probe measurements in three fuel compartments, in accordance with an illustrative embodiment;

FIG. 9 is an illustration the relationship between the matrices involved with the least squares calculation, in accordance with an illustrative embodiment;

FIG. 10 is an illustration of least squares in matrix form, in accordance with an illustrative embodiment;

FIG. 11 is an illustration of an equation used for determining whether a measurement from a probe is to be deemed an outlier measurement, in accordance with an illustrative embodiment;

FIG. 12 is an illustration of a series of equations used for determining a pitch and roll accuracy check (measurement confidence), in accordance with an illustrative embodiment;

FIG. 13 is an illustration of a system of equations used for performing a linearity check of the A matrix (or A2 matrix for the second least squares fit) appearing the least squares calculation, in accordance with an illustrative embodiment;

FIG. 14 is an illustration of example matrices from flight test data from fluid level probes in multiple fluid compartments, in accordance with an illustrative embodiment;

FIG. 15 is an illustration of example matrices continued from FIG. 14, in accordance with an illustrative embodiment;

DETAILED DESCRIPTION

Figure 1:
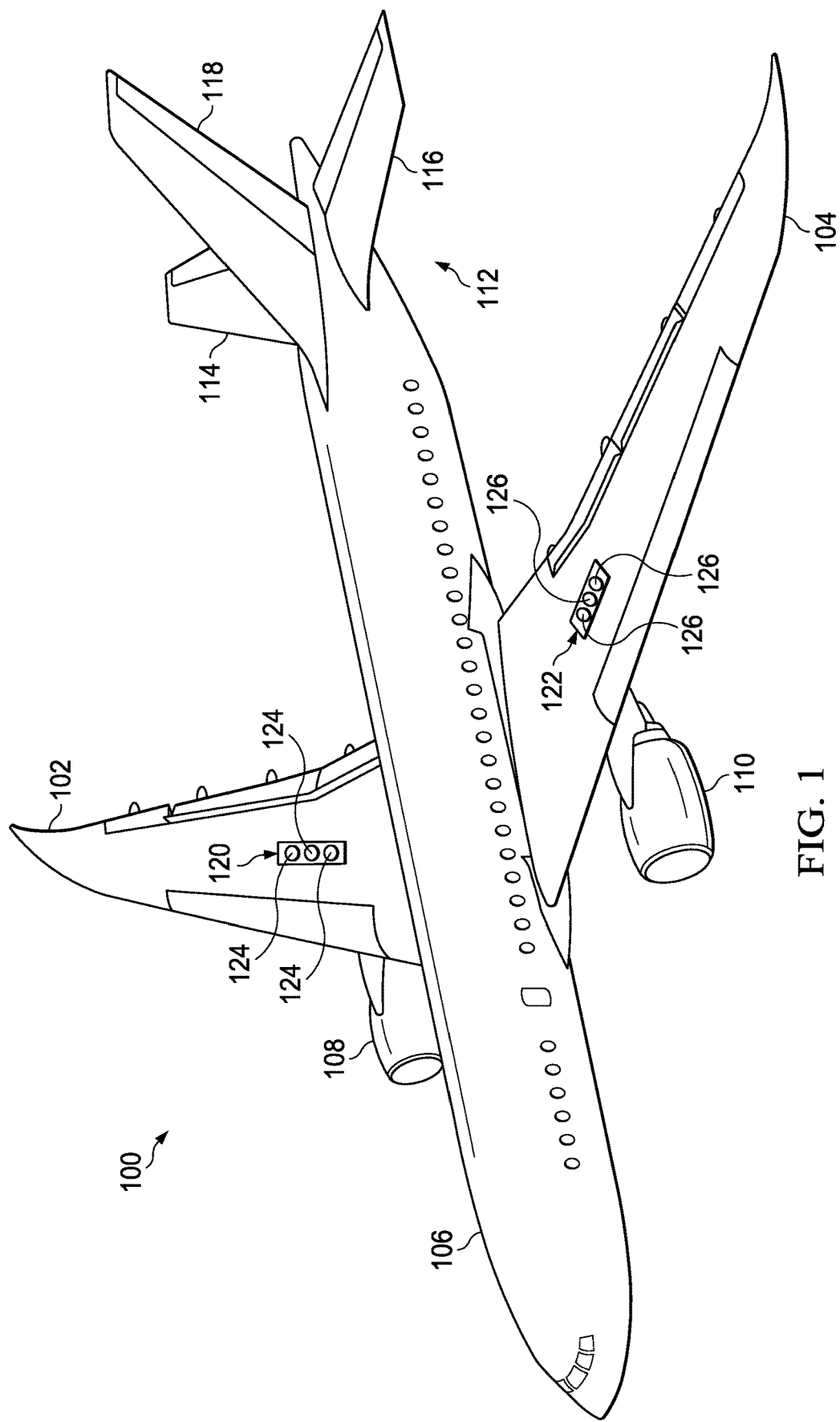
FIG. 1 is an illustration of an aircraft in accordance with an illustrative embodiment.

The illustrative embodiments recognize and take into account that combining fluid level measurements from independent compartments with maximum redundancy is superior to measuring the compartments separately and also superior to less sophisticated methods of compartment combination. Thus, the illustrative embodiments provide for superior identification and elimination of measurements from bad fluid level sensors, thereby providing superior fluid level and orientation measurements and estimation of confidence in fluid orientation measurements. The fluid orientation estimates may be used to cross check inertial reference measurements, and thus represent a method to sanity check attitude measurements from an inertial reference unit.

The illustrative embodiments also recognize and take into account that measurement errors in complex multi-compartment fluid systems are subject to orientation and acceleration changes and high degrees of chronic sensor errors. The errors in the measurement of fluid mass, fluid volume, fluid orientation, and sensor health are greatly reduced by use of the illustrative embodiments.

The illustrative embodiments further recognize and take into account that existing solutions estimate fluid orientation on a compartment-by-compartment basis. Faulty sensors are identified at the electronic level by measuring voltages and current, not from the measurements of the sensors themselves. This older approach has several difficulties. For example, there is no determination of a confidence of the measurements. In another example, sensor faults that are not identified with the aforementioned method will not be identified. In still another example there can be no determination of a confidence of the sensors themselves beyond obvious failures in voltage or current ranges. In yet another example, outlier sensors cannot be removed on a measurement-by-measurement basis. Therefore, the effect of substandard sensors will always be present in the final measurements, when using older techniques.

Thus, the illustrative embodiments provide for a complete exploitation of all that redundancy in measurements has to offer. For example, the illustrative embodiments provide for improved availability, improved accuracy, improved robustness, dynamic determination of the quality of the estimates, and a better characterization of sensor health. This fact results in higher quality estimates of fluid orientation, estimation of confidence in fluid orientation, better estimation of fluid mass and volume, higher quality sensor rejection using dynamic tolerances, and the possibility of inertial reference measurement cross-checks. Thus, the illustrative embodiments provide for a significant improvement over prior fluid quantity determinations in a moveable platform.

For example, the illustrative embodiments have several advantages over the older method of fluid quantity determination. The illustrative embodiments improve mission performance by improving mission availability due to improved robustness and quality of fuel quantity measurements. The illustrative embodiments provide for cost savings through improved mission availability. The illustrative embodiments also provide for fuel quantity measurements that allow for the possibility of reducing fuel margins over mission requirements, thereby saving fuel. The illustrative embodiments also assist in the avoidance of unnecessary maintenance.

The illustrative embodiments are applicable to any moveable platform. Thus, while the illustrative embodiments are described with respect to an aircraft, and particularly to an airplane, the illustrative embodiments also may be applied to any vehicle or building having multiple fluid compartments with fluid level sensors disposed therein, including but not limited to buildings and other types of vehicles, such as but not limited to helicopters, boats, submarines, automobiles, tanks, and any other moveable platform having fluid tanks and fluid sensors disposed therein.

As used herein, the following definitions apply:

"Accuracy" is how close the pitch and roll measurements are to their true values.

"Redundancy" is how many more than the minimum number of measurements are being used to calculate fuel plane pitch and roll. For example, if there are four probes all in the same compartment, then the redundancy is one because three probes are needed to determine a plane.

"Availability" is the percentage of time that pitch and roll measurements can be calculated subject to the required accuracy and redundancy.

"Maximum redundancy" means using the most number of valid fluid level sensors or probes available to perform fluid level measurements.

With reference now to the figures, and in particular, with reference to FIG. 1, an illustration of an aircraft is depicted in accordance with an illustrative embodiment. Aircraft 100 is an example of an aircraft in which the combination of fluid level measurements from independent compartments with maximum redundancy may be implemented, in accordance with an illustrative embodiment.

In this illustrative example, aircraft 100 has wing 102 and wing 104 attached to body 106. Aircraft 100 includes engine 108 attached to wing 102 and engine 110 attached to wing 104. Aircraft 100 could be any other aircraft, such as a prop aircraft, a helicopter, or some other moveable platform such as an automobile, boat, or even a building constructed to sway when subjected to forces, with the platform having multiple fluid compartments and one or more fluid level sensors in each of the multiple fluid compartments. The illustrative embodiments could also operate with fluid level sensors in only one of the fluid compartments.

Aircraft 100 may have other features. For example, body 106 has tail section 112. Horizontal stabilizer 114, horizontal stabilizer 116, and vertical stabilizer 118 are attached to tail section 112 of body 106.

Aircraft 100 may also include fluid compartment 120 and fluid compartment 122. In an illustrative embodiment, each of these fluid compartments may be fuel compartments. More or fewer fluid compartments may be present. In an illustrative embodiment, each of the fluid compartments may have one or more fluid level sensors disposed therein. For example, fluid compartment 120 may have fluid level sensors 124 and fluid compartment 122 may have fluid level sensors 126. While three fluid level sensors are shown in each compartment, these numbers may be varied. More or fewer fluid level sensors may be present in each compartment, and different fluid compartments may have differing numbers of fluid level sensors. A given fluid compartment might have no fluid level sensors, though the illustrative embodiments preferably make use of measurements from multiple fluid level sensors in each of multiple fluid compartments. In a specific practical application, there may be nine or more fluid level sensors in each of the fluid compartments on aircraft 100.

Figure 2:
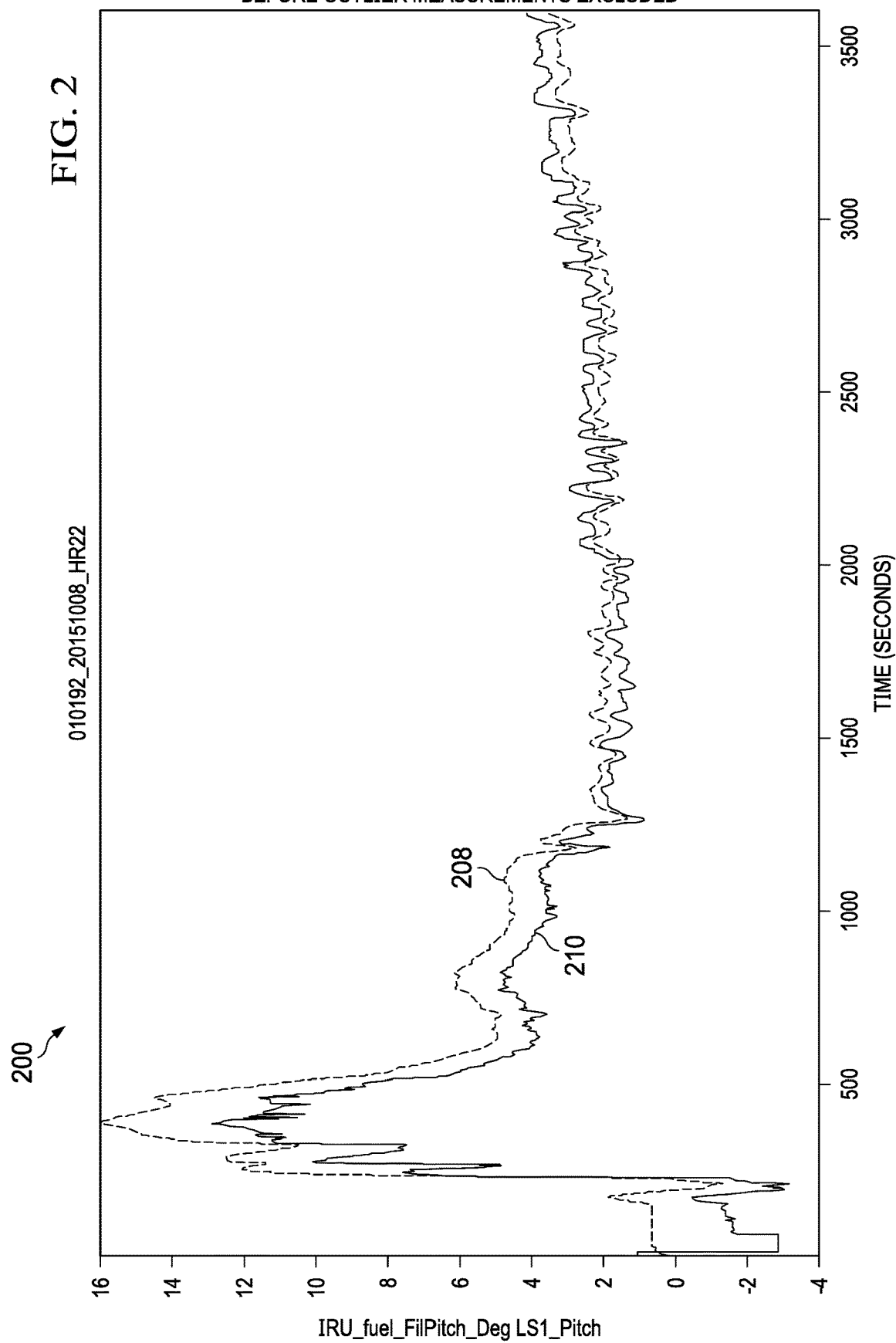
FIG. 2 is an illustration of a graph of a comparison between fuel plane pitch from an inertial reference unit on board an aircraft and a fuel plane pitch determination from use of least squares technique on measurements of probes from multiple fuel compartments in the aircraft, before removal of outlier measurements, in accordance with an illustrative embodiment.
Figure 3:
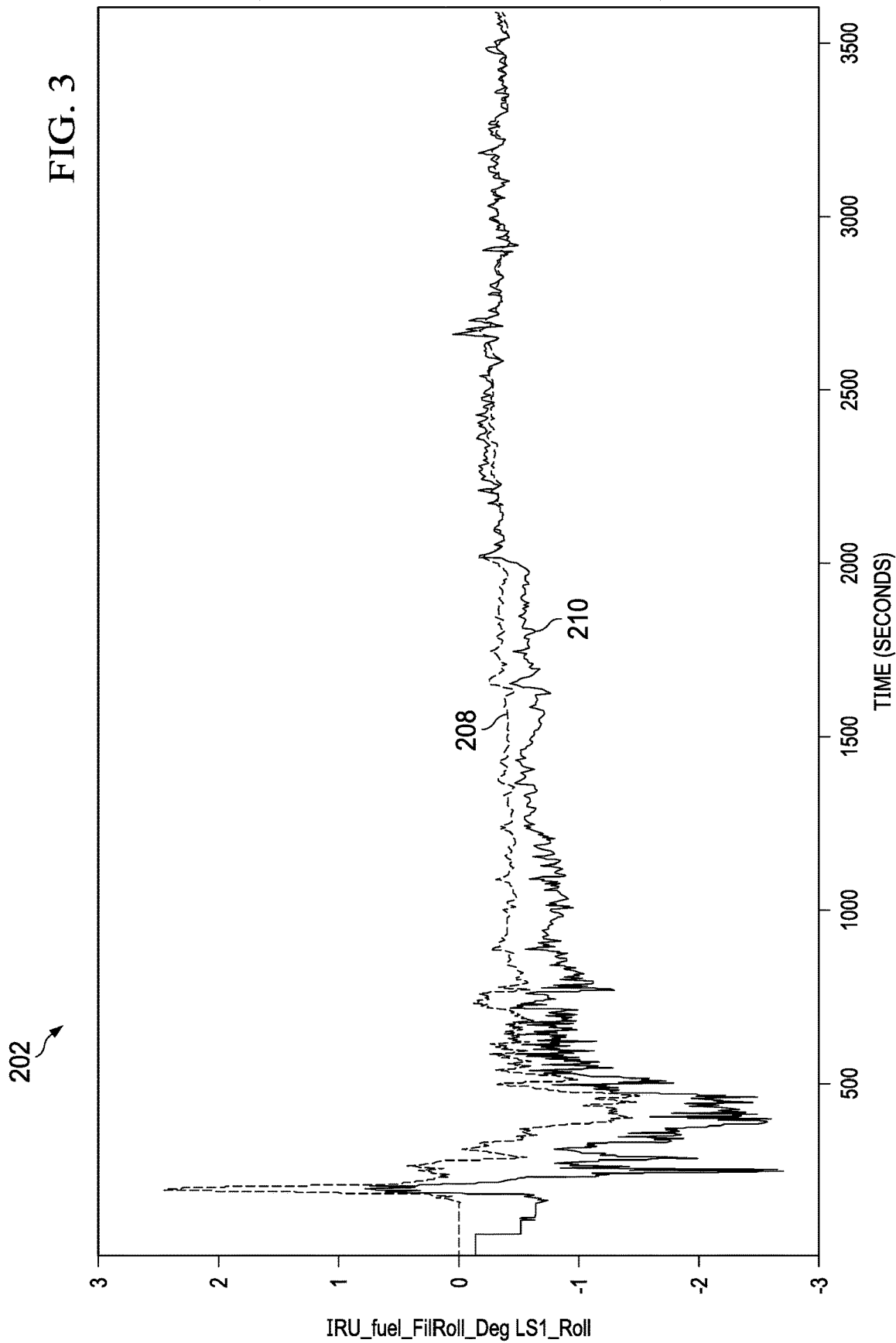
FIG. 3 is an illustration of a graph of a comparison between fuel plane roll from an inertial reference unit on board an aircraft and a fuel plane roll determination from use of least squares technique on measurements of probes from multiple fuel compartments in the aircraft, before removal of outlier measurements, in accordance with an illustrative embodiment.
Figure 4:
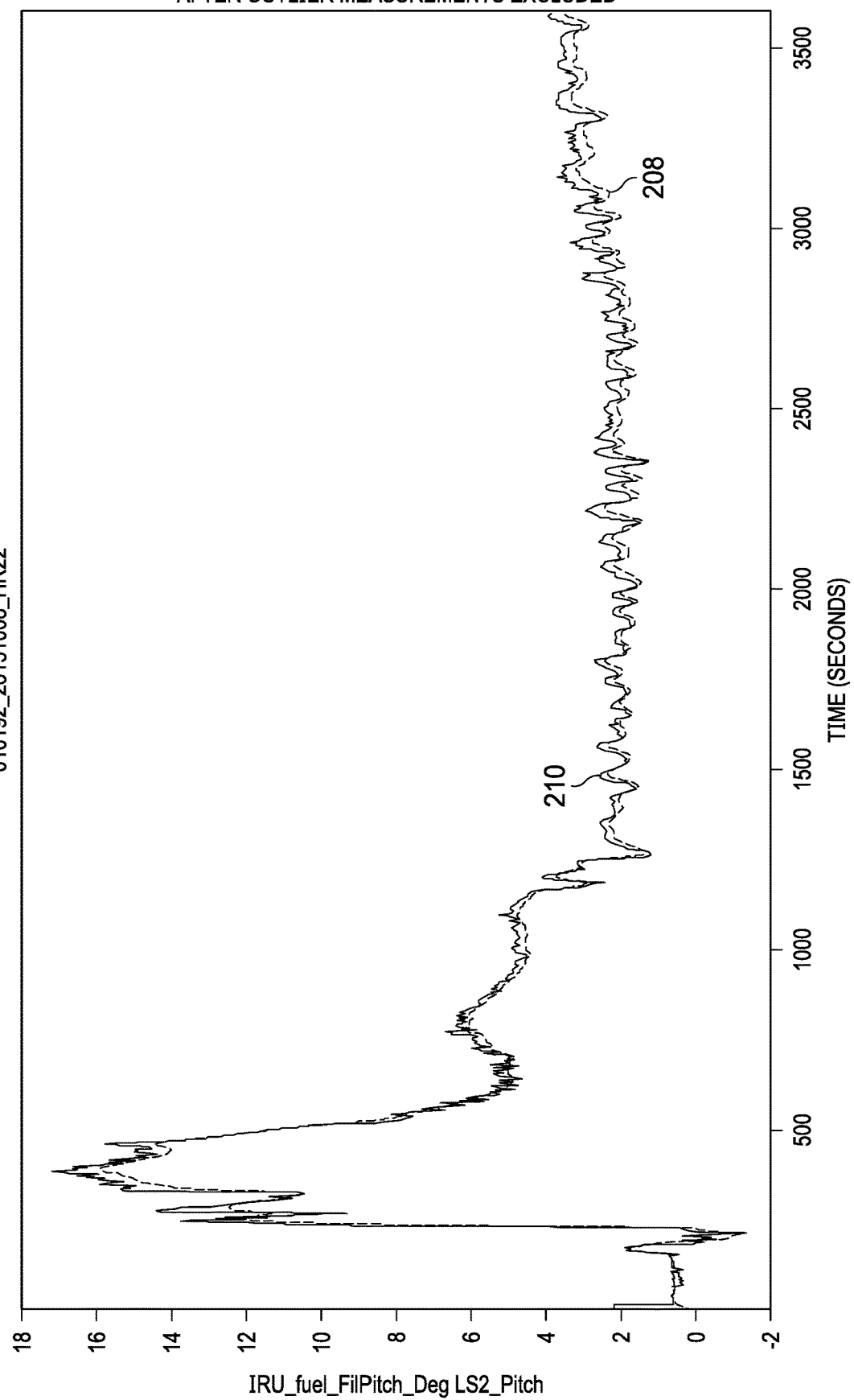
FIG. 4 is an illustration of a graph of a comparison between fuel plane pitch from an inertial reference unit on board an aircraft and a fuel plane pitch determination from use of least squares technique on measurements of probes from multiple fuel compartments in the aircraft, after exclusion of outlier measurements from particular probes, in accordance with an illustrative embodiment.
Figure 5:
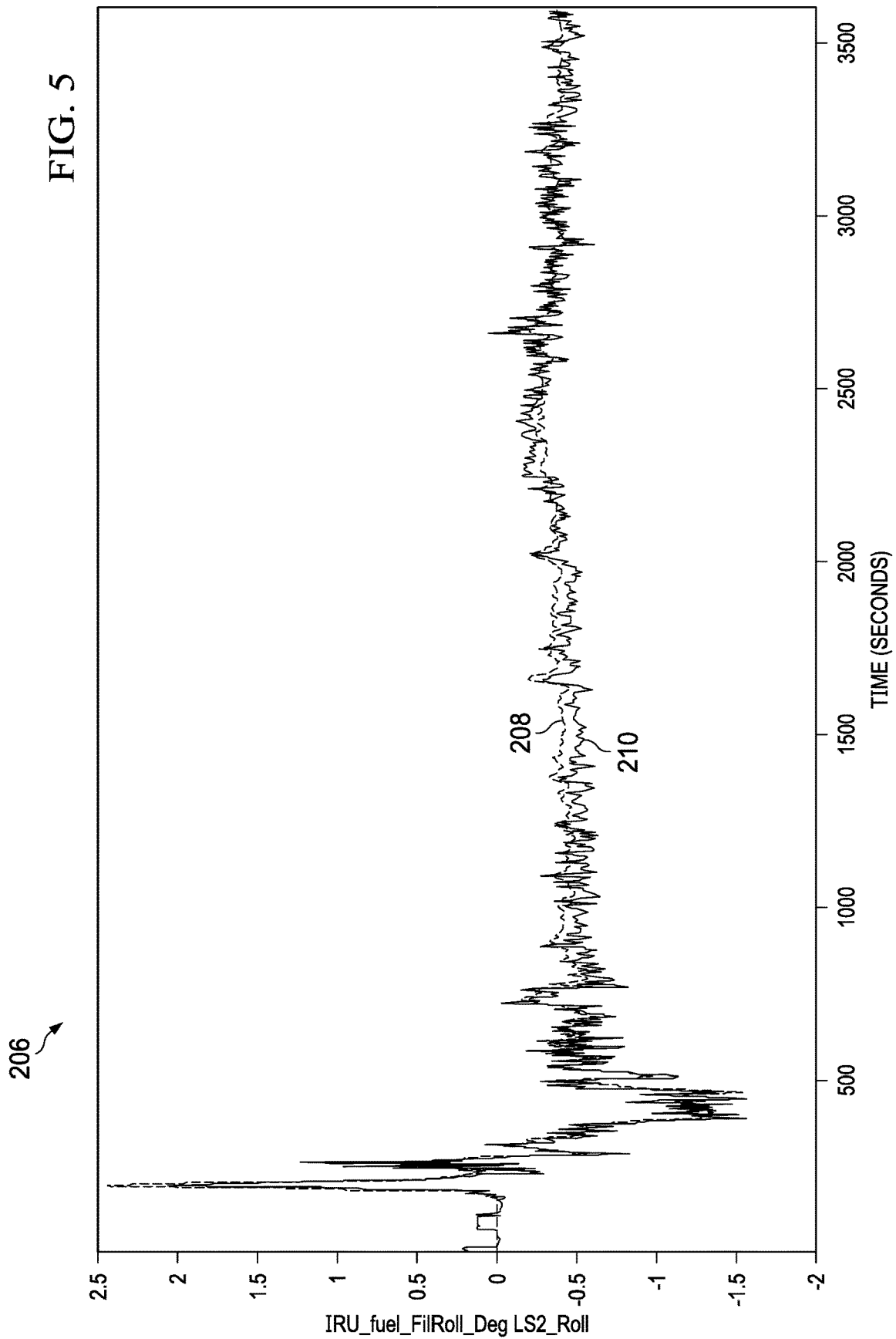
FIG. 5 is an illustration of a graph of a comparison between a fuel plane roll from an inertial reference unit on board an aircraft and a fuel plane roll determination from use of least squares technique on measurements of probes from multiple fuel compartments in the aircraft, after exclusion of outlier measurements from particular probes, in accordance with an illustrative embodiment.

FIG. 2 through FIG. 5 should be read together. FIG. 2 through FIG. 5 illustrate the improvements provided by the illustrative embodiments described herein. More specifically, FIG. 2 and FIG. 3 compare pitch and roll determinations based on fluid level measurements to an inertial measurement of pitch and roll after a first pass of the illustrative embodiments. Pitch is one of two components specifying the fluid's orientation relative to the platform. Roll is another one of the two components specifying the fluid's orientation relative to the platform. FIG. 4 and FIG. 5 compare pitch and roll determinations based on fluid level measurements to an internal measurement of pitch and roll after a second pass of the illustrative embodiments. These improvements are implemented by the techniques described with respect to FIG. 6 through FIG. 17.

These issues have presented a long-felt but unmet need in the art. For example, current designs for dealing with this issue have a high sensitivity to probe errors. This high sensitivity is caused by several reasons. One reason is that single compartment pitch and roll estimates have low redundancy. Another reason is that outlier probes are not removed. Another reason is that asymmetrical errors are caused by dissimilar pitch and roll for mirror compartments. A mirror compartment is, for example, a first compartment on the left wing and a second independent compartment on the right wing.

In the absence of slosh, the fuel plane direction, which is the instantaneous apparent local vertical, is approximately the same for all locations on the airplane. For any point on the aircraft the instantaneous apparent local vertical is in the direction of the vector sum of minus the acceleration due to gravity plus the acceleration of vectors $-g+a$, where g is gravity and a is acceleration of the aircraft. The angular velocity and angular acceleration effects on the instantaneous apparent local vertical may be small enough to be neglected.

Data regarding the distribution of a fluid in a fluid compartment may be taken using probes, otherwise known as fluid level sensors. Capacitive probes may provide coordinates of points belonging to the fuel surface, planar or not, for the compartment that they are in.

Fuel surface coordinates can be fitted, using a least squares mathematical technique, to planes for each compartment, whereby these planes share a common fuel plane attitude (pitch and roll) but have different heights. This procedure is performed in one unified calculation rather than separately for each compartment. This fact represents a significant advancement over the known art of other techniques for using probes to determine fluid related quantities in the fluid compartments.

For example, the commonality of fuel plane attitude between compartments provides redundancy which can be exploited. This feature is made possible by the unified calculation.

When fuel is sloshing, the fuel surface does not lie in a geometric plane. Therefore, the planar fits will not be good and this is not detected using older techniques. The algorithm of the illustrative embodiments can detect this and, more importantly, can aid in reducing errors produced by sloshing of the fluid within the fluid compartments.

The illustrative embodiments described with respect to FIG. 6 through FIG. 17 have been tested on a real C-17 aircraft using real flight data. FIG. 2 through FIG. 5 provide an example of analysis of flight test data to show the least squares estimates of the fluid's pitch and roll derived from probes in fluid compartments as compared to pitch and roll (of the local vertical) as measured by an inertial reference unit. FIG. 2 through FIG. 5 thus demonstrate that the illustrative embodiments compares reasonably against the inertial reference unit determinations.

The probe data represented in FIG. 2 through FIG. 5 were taken during a time in which significant fuel measurement errors were observed in the aircraft, such as 5000 pounds in a fourth fluid compartment of the aircraft. A code emulator calculated coordinates of fuel plane intersections for all partially wet probes using flight test capacitances and output these coordinates to a file. A MATLAB® script read in the file and executed the least squares pitch and roll estimation algorithm described with respect to FIG. 6 through FIG. 17.

Pitch and roll of a fuel plane (relative to the platform) were determined from inertial reference unit flight test data, using attitudes and accelerations, and using a separate program. This determination was overlaid over the least squares estimates of pitch and roll results as calculated from the probes using the illustrative embodiments. The pitch and roll least squares estimates of the new algorithm was fed back into the emulator, resulting in greatly reduced fuel measurement errors.

Again, FIG. 2 through FIG. 5 should be read together. Thus, FIG. 2 is an illustration of a graph of a comparison between fuel plane pitch from an inertial reference unit on board an aircraft and a fuel plane pitch determination from use of the least squares technique on measurements of probes from multiple fuel compartments in the aircraft, before removal of outlier measurements, in accordance with an illustrative embodiment. Pitch is one of two components specifying the fluid's orientation relative to the platform.

FIG. 3 is an illustration of a graph of a comparison between fuel plane roll from an inertial reference unit on board an aircraft and a fuel plane roll determination from use of the least squares technique on measurements of probes from multiple fuel compartments in the aircraft, before removal of outlier measurements, in accordance with an illustrative embodiment. Roll is one of the two components specifying the fluid's orientation relative to the platform. FIG. 4 is an illustration of a graph of a comparison between fuel plane pitch from an inertial reference unit on board an aircraft and a fuel plane pitch determination from use of least squares technique on measurements of probes from multiple fuel compartments in the aircraft, after exclusion of outlier measurements from particular probes, in accordance with an illustrative embodiment. FIG. 5 is an illustration of a graph of a comparison between fuel plane roll from an inertial reference unit on board an aircraft and a fuel plane roll determination from use of least squares technique on measurements of probes from multiple fuel compartments in the aircraft, after exclusion of outlier measurements from particular probes, in accordance with an illustrative embodiment. FIG. 2 through FIG. 5 share common reference numerals.

Graph 200 is a graph of fuel plane pitch over time. Graph 202 is a graph of fuel plane roll over time. Graph 204 is a graph of fuel plane pitch over time, after outlier measurements have been excluded. Graph 206 is a graph of fuel plane roll over time, after outlier measurements have been excluded.

Lines 208 represent fuel plane pitch and roll in degrees as determined by the inertial reference unit. Lines 210 represent a universal pitch and roll determination from least squares analysis of measurements taken by probes from multiple fluid compartments, according to the illustrative embodiments described further below, as measured in degrees.

As can be seen, the illustrative embodiments are highly accurate determinations of pitch and roll of the aircraft as determined from fluid level measurements from probes inside the various fluid compartments in the aircraft, relative to similar measurements made by an inertial reference unit. FIG. 4 and FIG. 5 further show that outlier measurements from faulty sensors can be detected by the techniques described below, and excluded from the universal pitch and roll determination. FIG. 4 and FIG. 5 in particular show that excluding the detected outlier measurements resulted in extremely accurate determinations of pitch and roll of the fuel plane relative to the platform as evidenced by their agreement with the inertial reference unit.

In this particular illustrative embodiment, there were between three and eight probe measurements that were excluded for the purpose of estimating pitch and roll during this interval. Thus, the illustrative embodiments are robust in terms of the ability to detect and minimize errors that plagued fluid quantity determinations, as described above with respect to prior techniques.

Figure 6:
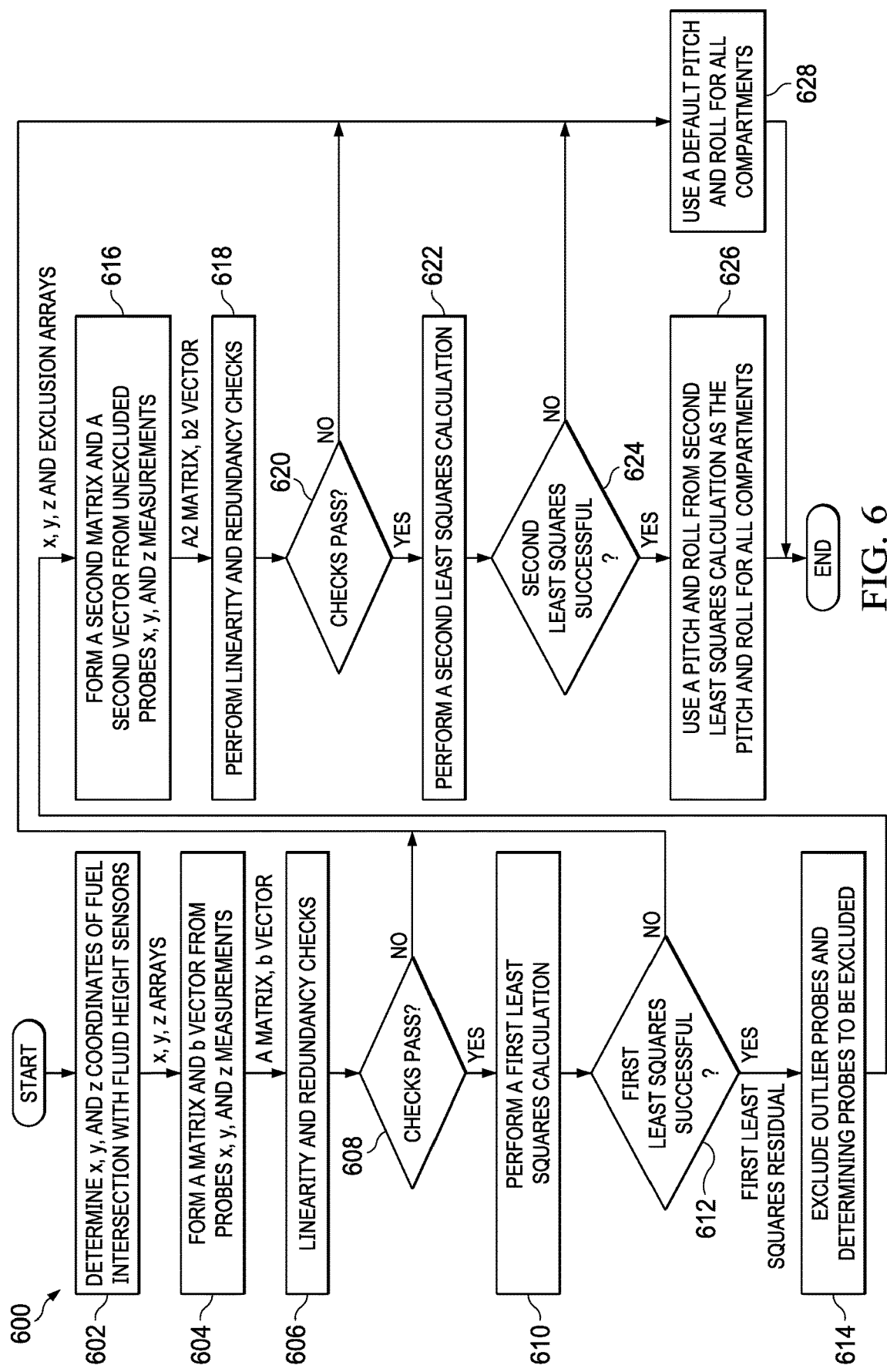
FIG. 6 is an illustration of a flowchart of an algorithm for computing least squares fuel plane pitch and fuel plane roll, in accordance with an illustrative embodiment.

FIG. 6 is an illustration of a flowchart of an algorithm for computing the least squares estimate of pitch and roll of the fluid relative to the platform, in accordance with an illustrative embodiment. Method 600 may be implemented using a computer, such data processing system 1800 of FIG. 18. Method 600 may be part of operating an aircraft, such as for example operating the aircraft to minimize fuel consumption.

Method 600 begins by determining x, y, and z coordinates of fuel intersection with fluid height sensors (operation 602). Next, method 600 includes forming an A matrix and b vector from the probes' x, y, and z measurements (operation 604). Method 600 then performs linearity and redundancy checks (operation 606) on the A matrix and b vector.

If the check passes (operation 608), then method 600 includes performing a first least squares calculation (operation 610). If the check does not pass, then method 600 skips to operation 628, below, and proceeds accordingly. Assuming the check passes at operation 608, method 600 then determines whether the first least squares calculation is successful (operation 612). If the first least squares calculation is not successful, then method 600 skips to operation 628 and proceeds accordingly.

However, if the first least squares calculation is successful, then method 600 includes excluding outlier probes and determining probes to be excluded (operation 614). Method 600 then forms a second A matrix and a second b vector from unexcluded probes x, y, and z measurements (operation 616). Method 600 then includes performing linearity and redundancy checks (operation 618) on the second A matrix and the second b vector.

Method 600 then includes a determination whether the checks pass (operation 620). If the check does not pass, then method 600 skips to operation 628 and proceeds accordingly. However, if the check passes at operation 620, then method 600 includes performing a second least squares calculation (operation 622).

A determination is then made if the second least squares calculation is successful (operation 624). If the second least squares determination is not successful, then method 600 skips to operation 628 and proceeds accordingly. However, if the second least squares calculation is successful, then method 600 includes a determination that the least squares calculation is valid, and then method 600 includes using a pitch and roll from the second least squares calculation as the pitch and roll for all compartments (operation 626). In one illustrative embodiment, the method may terminate thereafter.

Returning to operation 612, if the first least squares calculation was not successful, then a determination is made that the least squares calculation is invalid. In this case, method 600 uses a default pitch and roll (values that are reasonable, if estimates are not available) for all compartments (operation 628). Method 600 then terminates thereafter. Operation 628 is also performed if any of the other checks or determinations at operations 608, 620, or 624 fail.

Method 600 may be varied. More or fewer operations may be present. For example, in one illustrative embodiment, the second least squares calculation may be skipped, in which case if the first least squares calculation is successful, then method 600 may skip to operation 626. Thus, the illustrative embodiments are not necessarily limited by the examples provided in FIG. 6.

The illustrative embodiments described with respect to FIG. 6, and also elsewhere herein, benefit from maximum redundancy. Maximum redundancy means using the most number of valid fluid level sensors or probes available.

More redundancy averages out errors and lowers the sensitivity to individual probe errors, thereby improving accuracy. More redundancy improves the ability to exclude outlier probes, thereby improving accuracy. More redundancy provides a better statistical estimate of measurement accuracy. Requiring more redundancy improves accuracy for the reasons above but worsens availability because there are times when there are not enough probes. The more stringent the accuracy requirement, the lower the percentage of measurements than can be kept. Accuracy may be improved at the expense of availability.

Method 600 sometimes excludes measurements from probes which would not be detected as faulty by traditional methods, thereby adding an additional line of defense against anomalous measurements. Examples of traditional methods of detecting faulty probes are monitoring current ranges for out of range conditions, monitoring voltage ranges for out of range conditions, and validating the shapes of electrical waveforms output by the probes.

FIG. 7 is an illustration of the fluid plane equation (in this case the fluid is fuel) which specifies a plane that each point on the fluid surface would lie on if the fluid was completely settled (i.e. no slosh); in accordance with an illustrative embodiment. This is the geometric plane to which all fluid measurements are least squares fitted. The x, y, and z coordinates are all with respect to common origin residing on the platform. In the case of the application illustrated, the platform is an airplane; the x axis points forward (out the nose), the y axis points right (as the observer is looking forward), and the z axis points down through the aircraft belly.

In FIG. 7, generally speaking, the equation that is used is $z=Px+Ry+Ci$, where x, y, and z are coordinates of points on the fuel plane in inches, where "P" is a pitch fuel plane coefficient in radians, where "R" is a roll fuel plane coefficient in radians, and where "Ci" is a height of the fuel plane at $x=0$, $y=0$ for the "$i^{th}$", fuel compartment. The pitch and roll coefficients are approximately equal to the pitch and roll of the aircraft about the upwardly pointing fuel plan normal in radians.

FIG. 8 is an illustration of a system of equations used for performing fuel plane pitch and roll determinations using least squares for nine probe measurements in three fuel compartments, in accordance with an illustrative embodiment. Attention is now turned to the mathematics of the least squares analysis, such as those mentioned in method 600.

FIG. 8 specifically is an example for nine probe measurements in three fluid compartments. There are nine equations and five unknowns, representing a redundancy of four. FIG. 8 shows mathematics 800 for fuel plane pitch and roll determinations including system of equations 802, and the matrix 804 equivalent of system of equations 802.

In particular, matrix b 806 is a nine by one matrix representing values of z. Matrix A 808 is a nine by five matrix and represents the variables and integers designating which compartment's fuel plane height applies to the row. Matrix X 808 is a five by one matrix representing the constants of the equations.

Stated differently, the resulting equation can be characterized as $b=AX$. "b" represents the column vector of fuel plane z coordinates from each probe used. "A" is the matrix with rows composed of x, y coordinates from each probe used and a vector containing a single "one" with the rest of the entries being zeros. The "one" entry specifies which compartment's fuel plane height applies to the row. "X" represents the column vector of quantities to be estimated, pitch, roll, and plane heights for each compartment.

FIG. 9 is an illustration the relationship between the matrices involved with the least squares calculation. The error vector e in the equation, shows that there is an inconsistency between the assumed perfect fluid plane ($b=Ax$) and the measured fluid plane coordinates from the probes. The inconsistency can be caused by the fluid's surface sloshing, and therefore not lying on a plane and/or measurement errors.

FIG. 10 is an illustration of least squares in matrix form, in accordance with an illustrative embodiment. The least squares solution described with respect to FIG. 10 minimizes the sum of the residual components squared independent of any assumptions about the errors. The least squares estimate is defined as "xls" and is represented by: $xls=(A^tA)^{-1}A^tb$, although for numerical analysis accuracy reasons, this equation is frequently recast in QR factorization form (not shown). The residual vector is designated by "r" and is represented by: $r=b-(A)xls$. The sum of the square of the residual components is defined by "rsumsq", and is represented by: $rsumsq=\Sigma(ri)2$.

The better the measurements "fit" a plane, the smaller "rsumsq" will be. Goodness of fit is influenced by fuel plane stability and measurement errors. The least squares estimate will still minimize the sum of the residual squared, even if the fit isn't good. Due to numerical instability of the "xls" equation above, the factorization to solve an equivalent system which is more numerically stable.

More generally, let "m" be the number of measurements. Let "n" be the number of states to estimate, the "P", "R" (common to all compartments), and the "C's", one for each fluid compartment. In this case, b will be a matrix of m rows and 1 column. "A" will be a matrix of m rows and n columns. "x" will be a matrix of n rows and 1 column. "xls" will be a matrix of n rows and one column. "r" will be a matrix of m rows and 1 column.

Ideally, all of the following conditions should be met for the least squares calculation to succeed. These conditions apply to both the first and second least squares calculations mentioned in FIG. 6.

First, the matrix and vector sizes must be compatible. Second, the redundancy (m−n) should be at least three for the first least squares fit and should be at least one for the second least squares fit (however, these redundancies can be adjusted empirically). Third, the "A" matrix is sufficiently well conditioned, that is the least squares solution is not too sensitive to precision and calculation errors, as determined by nonlinearity check and QR factorization check (not shown).

The residual becomes insensitive to the pitch and roll least squares estimate as the probes become closer to lying on a line. Thus, as probes approach lying on a single line, a very small change in minimum residual represents a big change in the least squares pitch and roll. The least squares pitch and roll become very sensitive to calculation errors because the residual is becoming less dependent on the pitch and roll estimates. The "A" matrix is said to be ill-conditioned when this happens.

The "A" matrix contains the horizontal probe positions in the aircraft's body axis (their x and y body coordinates), so the probes' linearity information is contained in the "A" matrix. The linearity check performs a least squares fit on the probes' x and y body coordinates. The least squares routine is run using an "Alin" matrix and "Blin" vector (see FIG. 13) which get their entries from the first two columns of the "A" or "A2" matrix. Large residuals indicate that the probes are far away from lying on a line, that is the probe positions do not fit a line. The largest residual, "Rmax," provides a bound on how far off a line at least one probe is from all of the others.

It can be proven that the non-linearity angle, the angle that at least one probe is from being on the same line as all the other probes, is always larger than [sqrt(2) Rmax)/L], where L is ymax−ymin. The threshold for the non-linearity angle for "A" and "A2" matrices may be 2 degrees, but could be selected to be some other angle. If the non-linearity angle is smaller than this, then the respective least squares calculation or calculations will not be performed.

In an alternative operation, a loop through all the angles of each probe pair could be performed and a check on whether an angle between two pairs of probes differed by more than 2 degrees. This determination would have accomplished the same thing as the "x y" least squares method. The "x y" least squares method may or may not be superior with respect to throughput. The least squares method was chosen because it was more appealing than looping through all possible combinations of probe pairs.

FIG. 11 is an illustration of an equation used for determining whether a measurement from a probe is to be deemed an outlier measurement, in accordance with an illustrative embodiment. Thus, equation 1100 of FIG. 11 represents an equation for determining an outlier. For each residual component "ri" from the first least squares fit, a probe is an outlier if its "nsigma" value is greater than 0.8 as defined below. The value "0.8" was determined empirically, therefore depending on the application, is can be changed.

If the measurement and slosh errors were zero mean, Gaussian, uncorrelated, and equal, the square root of the denominator would be a consistent and unbiased estimate of the error standard deviation. Even if none of these assumptions are met, this outlier criteria does well empirically. When a measurement is statused as an outlier, it will not be included in the second least squares calculation.

FIG. 12 is an illustration of a series of equations used for determining a pitch and roll accuracy check, in accordance with an illustrative embodiment. The 0.4 and 2 degree constants were determined empirically. The form of these equations is motivated by well-known statistical least squares results. Although the statistics of the measurement errors of fluid's deviation from a plane and the measurement errors do not conform to the statistical assumptions from which the form of these equations are derived, they work well empirically.

Attention is now turned to a pitch and roll accuracy check. Optionally, equations 1200 provide for calculating pitch and roll check evaluations. If any are greater than two degrees, or some other pre-selected value, then the accuracy check fails. For numerical stability reasons, method 600 uses the QR factorization of the A matrix to calculate $(AtA)^{-1}$.

Attention is now turned to computing least squares and QR factorization. The illustrative embodiments may use a modified Gram-Schmidt process to factor the A matrix into QR matrices. A=QR, A=n×m, Q=n×m, and R=n×n. Back substitution may be used to solve the equivalent system for the xls vector: R xls=Qtb, resulting in "n" equations in "n" unknowns.

If any diagonal entry of R has absolute value less than $10^{-4}$, then the A matrix is statused as not sufficiently well conditioned. If the precision of the calculations is improved, then the 10-4 could be decreased. When this is detected the least squares calculation exits. The linearity check will make this highly improbable as a small R diagonal entry can only happen for an ill-conditioned A matrix and the linearity check prevents this. The minimum value for the diagonal entries of R prevents divide by zeroes. The same QR factorization and back substitution routines are used for both the universal pitch and roll algorithm and the linearity check. The routines are just fed different A and B matrices.

The techniques for outlier removal and pitch/roll accuracy checks are motivated by least squares equations which are based on the errors meeting statistical assumptions. When the errors meet the statistical assumptions, the sigmas and covariances determined by the standard equations are "real". When sigmas and covariances appear in the algorithm it is understood that they are not "real" but were motivated by the standard equations. In addition, the standard equations might be modified to provide good empirical results.

FIG. 13 is an illustration of a system of equations used for performing a linearity check in a least squares determination of a fit of measurements to a line for measurements used in nine probes, such as described with respect to FIG. 8, in accordance with an illustrative embodiment. FIG. 13 is an example using nine probes. The "x" and "y" probe positions came from the first two columns of the A or A2 matrices.

In FIG. 13, "m" is the slope of the best fit probe line in the y x plane. "b" is the x intercept. As long as the probes have reasonable extension along the lateral (y) axis, which they always will for this particular example (see below), the slope (m) will always be far from being infinite, making this system always give a well-defined solution. In other words, "Alin" is guaranteed to be well conditioned.

From the equations in FIG. 13, R=blin−(Alin)(xlin_ls). The non-linearity angle=sqrt(2)*Rmax/L. L=ymax−ymin. "m" is the slope of the best fit probe line in the y x plane. "b" is the x intercept. As long as the probes have a reasonable extension along the y axis (which is lateral), the slope (m) will always be far from infinite, making this system always well-conditioned.

The required redundancy and number of probes per compartment guarantee that there will be probes from at least two compartments, resulting in reasonable lateral (y) separation or (b) probes from the same single compartment will have sufficiently different y values. In other words, at least 4 probes from a single compartment may be required to guarantee sufficient lateral (y) separation.

FIG. 14 and FIG. 15 should be read together. FIG. 14 is an illustration of example matrices from flight test data from fluid level probes in multiple fluid compartments, in accordance with an illustrative embodiment. FIG. 15 is an illustration of example matrices continued from FIG. 14, in accordance with an illustrative embodiment. Matrices 1400 and matrices 1500 represent real test data taken on a C-17 aircraft to determine fluid related quantities from fluid level measurements in multiple independent fluid compartments. In this case, the fluid was fuel.

Figure 16:
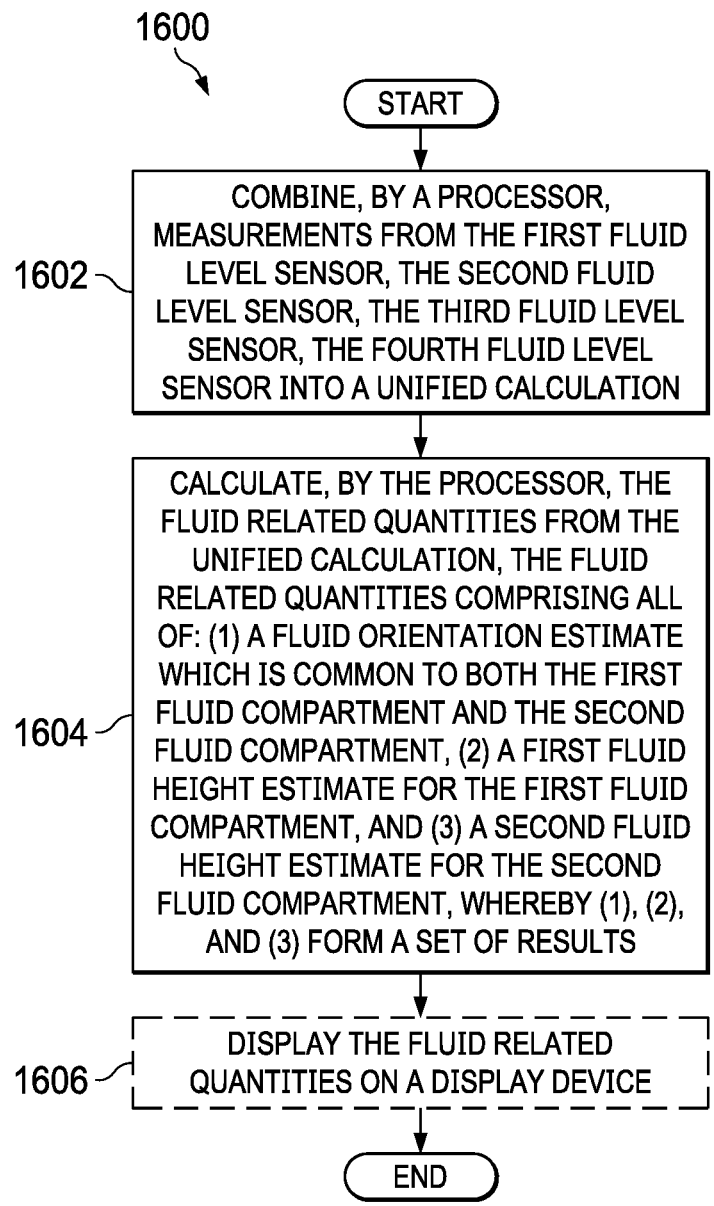
FIG. 16 is an illustration of a flowchart of a method of estimating fluid related quantities of a first fluid compartment and a second fluid compartment disposed in or connected to a moveable platform, wherein the first fluid compartment is independent of the second fluid compartment, wherein the first fluid compartment has disposed therein a first fluid level sensor and a second fluid level sensor, and wherein the second fluid compartment has disposed therein a third fluid level sensor and a fourth fluid level sensor, in accordance with an illustrative embodiment.

FIG. 16 is an illustration of a flowchart of a method of estimating fluid related quantities of a first fluid compartment and a second fluid compartment disposed in or connected to a moveable platform, wherein the first fluid compartment is independent of the second fluid compartment, wherein the first fluid compartment has disposed therein a first fluid level sensor and a second fluid level sensor, and wherein the second fluid compartment has disposed therein a third fluid level sensor and a fourth fluid level sensor, in accordance with an illustrative embodiment. Method 1600 is an alternative to method 600 of FIG. 6. Method 1600 may be implemented using a processor, such as data processing system 1800 of FIG. 18.

Method 1600 includes combining, by a processor, measurements from the first fluid level sensor, the second fluid level sensor, the third fluid level sensor, the fourth fluid level sensor into a unified calculation (operation 1602). Method 1600 also includes calculating, by the processor, the fluid related quantities from the unified calculation, the fluid related quantities comprising all of: (1) a fluid orientation estimate which is common to both the first fluid compartment and the second fluid compartment, (2) a first fluid height estimate for the first fluid compartment, and (3) a second fluid height estimate for the second fluid compartment, whereby (1), (2), and (3) form a set of results (operation 1604). In one illustrative embodiment, the method may terminate thereafter.

Method 1600 may be varied. For example, the unified calculation may be to solve 4 linear equations with 4 unknowns. In another variation, method 1600 may also include displaying the fluid related quantities on a display device (operation 1606). This operation is shown in a dotted box to indicate that operation 1606 is optional.

In still another variation, the platform is an aircraft. However, the platform may vary and may include any of a vehicle, a building, a boat, or other object for which measurement of fluid related qualities are desirable.

Other variations are also possible. Thus, the illustrative embodiments are not necessarily limited to the claimed inventions. For example, method 1600 may be embodied in program code, stored on a non-transitory computer-recordable storage medium, configured to perform method 1600 when executed by a processor. The processor may be either onboard or off-board the aircraft. Method 1600 may also be embodied as an aircraft having an onboard processor which communicates with such a non-transitory computer-recordable storage medium that stores such program code such that the illustrative embodiments are embodied in the form of the aircraft. Still other variations are possible.

Figure 17:
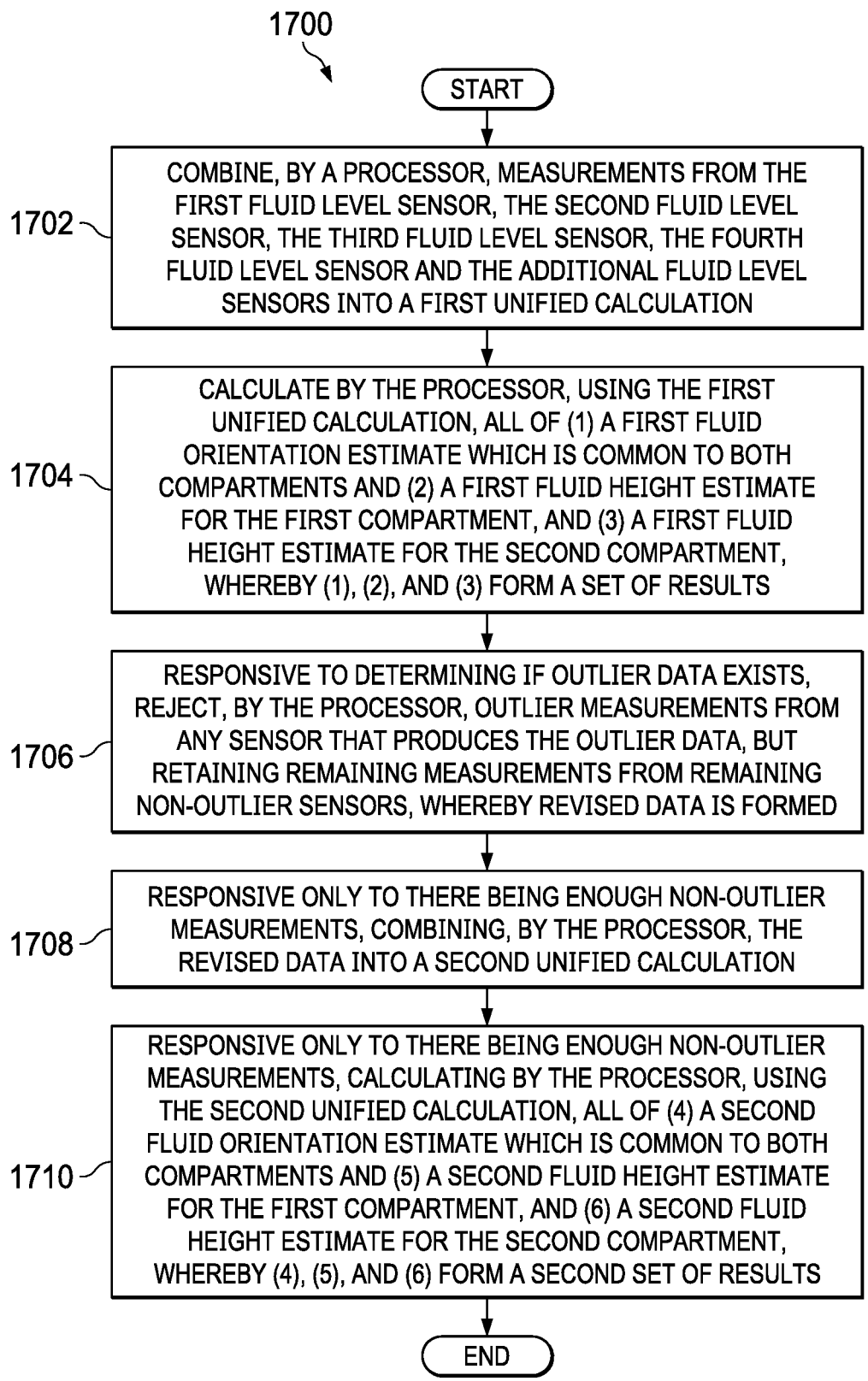
FIG. 17 is an illustration of a flowchart of a method of estimating fluid related quantities of a first fluid compartment and a second fluid compartment disposed in or connected to a moveable platform, wherein the first fluid compartment is independent of the second fluid compartment, wherein the first fluid compartment has disposed therein a first fluid level sensor and a second fluid level sensor, wherein the second fluid compartment has disposed therein a third fluid level sensor and a fourth fluid level sensor, and wherein at least one additional fluid level sensor is in either the first fluid compartment or the second fluid compartment, in accordance with an illustrative embodiment.

FIG. 17 is an illustration of a flowchart of a method of estimating fluid related quantities of a first fluid compartment and a second fluid compartment disposed in or connected to a moveable platform, wherein the first fluid compartment is independent of the second fluid compartment, wherein the first fluid compartment has disposed therein a first fluid level sensor and a second fluid level sensor, wherein the second fluid compartment has disposed therein a third fluid level sensor and a fourth fluid level sensor, and wherein at least one additional fluid level sensor is in either the first fluid compartment or the second fluid compartment, in accordance with an illustrative embodiment. Method 1700 is an alternative to method 600 of FIG. 6. Method 1700 may be implemented using a processor, such as data processing system 1800 of FIG. 18.

Method 1700 includes combining, by a processor, measurements from the first fluid level sensor, the second fluid level sensor, the third fluid level sensor, the fourth fluid level sensor and the additional fluid level sensors into a first unified calculation (operation 1702). Method 1700 also includes calculating by the processor, using the first unified calculation, all of (1) a first fluid orientation estimate which is common to both compartments and (2) a first fluid height estimate for the first compartment, and (3) a first fluid height estimate for the second compartment, whereby (1), (2), and (3) form a set of results (operation 1704).

Method 1700 also includes, responsive to determining if outlier data exists, rejecting, by the processor, outlier measurements from any sensor that produces the outlier data, but retaining remaining measurements from remaining non-outlier sensors, whereby revised data is formed (operation 1706). Method 1700 also includes, responsive only to there being enough non-outlier measurements, combining, by the processor, the revised data into a second unified calculation (operation 1708).

Method 1700 also includes, responsive only to there being enough non-outlier measurements, calculating by the processor, using the second unified calculation, all of (4) a second fluid orientation estimate which is common to both compartments and (5) a second fluid height estimate for the first compartment, and (6) a second fluid height estimate for the second compartment, whereby (4), (5), and (6) form a second set of results (operation 1710). In one illustrative embodiment, the method may terminate thereafter.

Method 1700 may be varied. For example, the first unified calculation and the second unified calculation comprises least squares analysis.

Method 1700 may include more or fewer operations. For example, method 1700 may further include displaying the second set of results on a display device.

In another illustrative embodiment, the platform comprises an aircraft. However, the platform itself may be varied, and may include but is not limited to a vehicle, a building, a boat, or other object for which fluid level measurements or estimates are desirable.

Additional variations are also possible. In another illustrative embodiment, method 1700 may further include, responsive to there being enough non-outlier measurements, using the second set of results to calculate an estimate of fluid stability. However, in a different illustrative embodiment, method 1700 may further include, responsive to there being enough non-outlier measurements, calculating an estimate of a confidence of the second set of results.

In a still different illustrative embodiment, method 1700 may further include, responsive to there not being enough non-outlier measurements, using the first set of results to calculate an estimate of fluid stability. In a yet different illustrative embodiment, method 1700 may further include, responsive to there not being enough non-outlier measurements, calculating an estimate of a confidence of the first set of results.

Other variations are also possible. Thus, the illustrative embodiments are not necessarily limited to the claimed inventions. For example, method 1700 may be embodied in program code, stored on a non-transitory computer-recordable storage medium, configured to perform method 1700 when executed by a processor. The processor may be either onboard or off-board the aircraft. Method 1700 may also be embodied as an aircraft having an onboard processor which communicates with such a non-transitory computer-recordable storage medium that stores such program code such that the illustrative embodiments are embodied in the form of the aircraft. Still other variations are possible.

Figure 18:
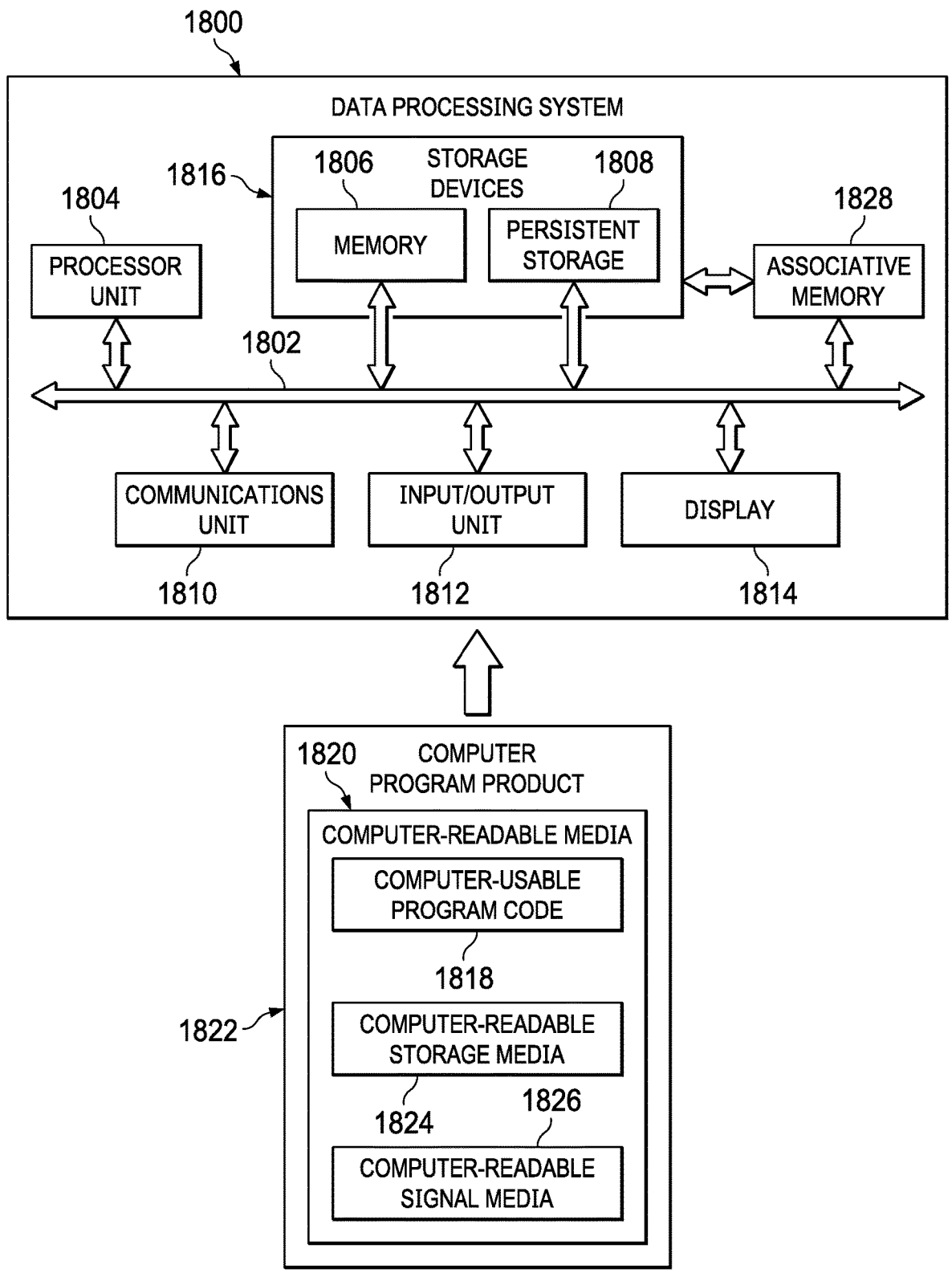
FIG. 18 is an illustration of a data processing system in accordance with an illustrative embodiment.

Turning now to FIG. 18, an illustration of a data processing system is depicted in accordance with an illustrative embodiment. Data processing system 1800 in FIG. 18 is an example of a data processing system that may be used to in conjunction with the illustrative embodiments, such as method 600 of FIG. 6, method 1800 of FIG. 18, or method 1700 of FIG. 17, or any other device or technique disclosed herein. In this illustrative example, data processing system 1800 includes communications fabric 1802, which provides communications between processor unit 1804, memory 1806, persistent storage 1808, communications unit 1810, input/output unit 1812, and display 1814.

Processor unit 1804 serves to execute instructions for software that may be loaded into memory 1806. This software may be an associative memory, which is a type of content addressable memory, or software for implementing the processes described herein. Thus, for example, software loaded into memory 1806 may be software for executing the algorithms described herein. Thus, such software may be program code 1800 of FIG. 18.

Processor unit 1804 may be a number of processors, a multi-processor core, or some other type of processor, depending on the particular implementation. A number, as used herein with reference to an item, means one or more items. Further, processor unit 1804 may be implemented using a number of heterogeneous processor systems in which a main processor is present with secondary processors on a single chip. As another illustrative example, processor unit 1804 may be a symmetric multi-processor system containing multiple processors of the same type.

Memory 1806 and persistent storage 1808 are examples of storage devices 1816. A storage device is any piece of hardware that is capable of storing information, such as, for example, without limitation, data, program code in functional form, and/or other suitable information, either on a temporary basis and/or a permanent basis. Storage devices 1816 may also be referred to as computer-readable storage devices in these examples. Memory 1806, in these examples, may be, for example, a random-access memory or any other suitable volatile or non-volatile storage device. Persistent storage 1808 may take various forms, depending on the particular implementation.

For example, persistent storage 1808 may contain one or more components or devices. For example, persistent storage 1808 may be a hard drive, a flash memory drive, a rewritable optical disk, a rewritable magnetic tape, or some combination of the above-mentioned devices. The media used by persistent storage 1808 also may be removable. For example, a removable hard drive may be used for persistent storage 1808.

Communications unit 1810, in these examples, provides for communications with other data processing systems or devices. In these examples, communications unit 1810 is a network interface card. Communications unit 1810 may provide communications through the use of either physical or wireless communications links, or both.

Input/output unit 1812 allows for input and output of data with other devices that may be connected to data processing system 1800. For example, input/output unit 1812 may provide a connection for user input through a keyboard, a mouse, and/or some other suitable type of input device. Further, input/output unit 1812 may send output to a printer. Display 1814 provides a mechanism to display information to a user.

Instructions for the operating system, applications, and/or programs may be located in storage devices 1816, which are in communication with processor unit 1804 through communications fabric 1802. In these illustrative examples, the instructions are in a functional form on persistent storage 1808. These instructions may be loaded into memory 1806 for execution by processor unit 1804. The processes of the different embodiments may be performed by processor unit 1804 using computer implemented instructions, which may be located in a memory, such as memory 1806.

These instructions are referred to as program code, computer-useable program code, or computer-readable program code that may be read and executed by a processor in processor unit 1804. The program code in the different embodiments may be embodied on different physical or computer-readable storage media, such as memory 1806 or persistent storage 1808.

Computer-usable program code 1818 is located in a functional form on computer-readable media 1820 that is selectively removable and may be loaded onto or transferred to data processing system 1800 for execution by processor unit 1804. Computer-usable program code 1818 and computer-readable media 1820 form computer program product 1822 in these examples. In one example, computer-readable media 1820 may be computer-readable storage media 1824 or computer-readable signal media 1826. Computer-readable storage media 1824 may include, for example, an optical or magnetic disk that is inserted or placed into a drive or other device that is part of persistent storage 1808 for transfer onto a storage device, such as a hard drive, that is part of persistent storage 1808. Computer-readable storage media 1824 also may take the form of a persistent storage, such as a hard drive, a thumb drive, or a flash memory, that is connected to data processing system 1800. In some instances, computer-readable storage media 1824 may not be removable from data processing system 1800.

Alternatively, computer-usable program code 1818 may be transferred to data processing system 1800 using computer-readable signal media 1826. Computer-readable signal media 1826 may be, for example, a propagated data signal containing computer-usable program code 1818. For example, computer-readable signal media 1826 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, computer-usable program code 1818 may be downloaded over a network to persistent storage 1808 from another device or data processing system through computer-readable signal media 1826 for use within data processing system 1800. For instance, program code stored in a computer-readable storage medium in a server data processing system may be downloaded over a network from the server to data processing system 1800. The data processing system providing computer-usable program code 1818 may be a server computer, a client computer, or some other device capable of storing and transmitting computer-usable program code 1818.

The different components illustrated for data processing system 1800 are not meant to provide architectural limitations to the manner in which different embodiments may be implemented. The different illustrative embodiments may be implemented in a data processing system including components, in addition to or in place of those, illustrated for data processing system 1800. Other components shown in FIG. 18 can be varied from the illustrative examples shown. The different embodiments may be implemented using any hardware device or system capable of running program code. As one example, the data processing system may include organic components integrated with inorganic components and/or may be comprised entirely of organic components, excluding a human being. For example, a storage device may be comprised of an organic semiconductor.

In another illustrative example, processor unit 1804 may take the form of a hardware unit that has circuits that are manufactured or configured for a particular use. This type of hardware may perform operations without needing program code to be loaded into a memory from a storage device to be configured to perform the operations.

For example, when processor unit 1804 takes the form of a hardware unit, processor unit 1804 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, or other suitable types of hardware devices. With this type of implementation, computer-usable program code 1818 may be omitted because the processes for the different embodiments are implemented in a hardware unit.

In still another illustrative example, processor unit 1804 may be implemented using a combination of processors found in computers and hardware units. Processor unit 1804 may have a number of hardware units and a number of processors that are configured to run computer-usable program code 1818. With this depicted example, some of the processes may be implemented in the number of hardware units, while other processes may be implemented in the number of processors.

As another example, a storage device in data processing system 1800 is any hardware apparatus that may store data. Memory 1806, persistent storage 1808, and computer-readable media 1820 are examples of storage devices in a tangible form.

In another example, a bus system may be used to implement communications fabric 1802 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, a cache. A memory may also be memory 1806, found in an interface and memory controller hub that may be present in communications fabric 1802.

Data processing system 1800 may also include an associative memory. An associative memory may be in communication with communications fabric 1802. An associative memory may also be in communication with, or in some illustrative embodiments, be considered part of storage devices 1816. Additional associative memories may be present.

As used herein, the term "associative memory" refers to a plurality of data and a plurality of associations among the plurality of data. The plurality of data and the plurality of associations may be stored in a non-transitory computer-readable storage medium. The plurality of data may be collected into associated groups. The associative memory may be configured to be queried based on at least indirect relationships among the plurality of data, in addition to direct correlations among the plurality of data. Thus, an associative memory may be configured to be queried based solely on direct relationships, based solely on at least indirect relationships, as well as based on combinations of direct and indirect relationships. An associative memory may be a content addressable memory.

Thus, an associative memory may be characterized as a plurality of data and a plurality of associations among the plurality of data. The plurality of data may be collected into associated groups. Further, the associative memory may be configured to be queried based on at least one relationship, selected from a group that includes direct and indirect relationships, or from among the plurality of data, in addition to direct correlations among the plurality of data. An associative memory may also take the form of software. Thus, an associative memory also may be considered a process by which information is collected into associated groups in the interest of gaining new insight based on relationships rather than direct correlation. An associative memory may also take the form of hardware, such as specialized processors or a field programmable gate array.

As used herein, the term "entity" refers to an object that has a distinct, separate existence, though such existence need not be a material existence. Thus, abstractions and legal constructs may be regarded as entities. As used herein, an entity need not be animate. Associative memories work with entities.

The different illustrative embodiments can take the form of an entirely hardware embodiment, an entirely software embodiment, or an embodiment containing both hardware and software elements. Some embodiments are implemented in software, which include but are not limited to forms such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer-readable medium can generally be any tangible apparatus that can contain, store, communicate, propagate, or transport the program for use by or in connection with the instruction execution system, apparatus, or device.

The computer-usable or computer-readable medium can be, for example, without limitation an electronic, magnetic, optical, electromagnetic, infrared, or semiconductor system, or a propagation medium. Non-limiting examples of a computer-readable medium include a semiconductor or solid-state memory, magnetic tape, a removable computer diskette, a random-access memory (RAM), a read-only memory (ROM), a rigid magnetic disk, and an optical disk. Optical disks may include compact disk read-only memory (CD-ROM), compact disk read/write (CD-R/W), or DVD.

Further, a computer-usable or computer-readable medium may contain or store a computer-readable or computer-usable program code, such that when the computer-readable or computer-usable program code is executed on a computer, the execution of this computer-readable or computer-usable program code causes the computer to transmit another computer-readable or computer-usable program code over a communications link. This communications link may use a medium that is, for example without limitation, physical or wireless.

A data processing system suitable for storing and/or executing computer-readable or computer-usable program code will include one or more processors coupled, directly or indirectly, to memory elements through a communications fabric, such as a system bus. The memory elements may include local memory employed during actual execution of the program code, bulk storage, and cache memories which provide temporary storage of at least some computer-readable or computer-usable program code to reduce the number of times code may be retrieved from bulk storage during execution of the code.

Input/output unit or input/output devices can be coupled to the system either directly or through intervening input/output controllers. These devices may include, for example, without limitation, keyboards, touch screen displays, or pointing devices. Different communications adapters may also be coupled to the system to enable the data processing system to become coupled to other data processing systems, remote printers, or storage devices through intervening private or public networks. Non-limiting examples of modems and network adapters are just a few of the currently available types of communications adapters.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of estimating a fluid plane attitude common to all fluid compartments independent of each other and in or connected to a moveable platform comprising a first fluid compartment comprising a first fluid level sensor and a second fluid level sensor, and a second fluid compartment comprising a third fluid level sensor and a fourth fluid level sensor, the method comprising:
estimating: the fluid plane attitude common to all fluid compartments, and for each fluid compartment, respectively, a height of a best fit planar fluid surface specific to the fluid compartment, via a processor unit using inputs consisting of: respectively for each fluid level sensor: a fluid height measurement, a location of the fluid level sensor, and the fluid compartment containing the fluid level sensor, and solving a system of equations modeling all fluid height measurements, from the fluid level sensors at their respective locations, lying on the best fit planar fluid surface specific to the fluid compartment containing the fluid level sensor; and
deriving from the fluid plane attitude common to all fluid compartments, at least one of: a cross check on measurements of an attitude of the moveable platform, or minimizing errors in measuring a mass or a volume of fluid in all fluid compartments on the moveable platform and thus reducing fluid margins required for performing a mission with the moveable platform.

2. The method of claim 1, further comprising:
the height of the best fit planar fluid surface specific to each fluid compartment being with respect to a common origin on the moveable platform;
the fluid plane attitude comprising a pitch fluid plane and a roll fluid plane; and
the system of equations comprising a pitch fluid plane coefficient and a roll fluid plane coefficient for determining an estimation of the fluid plane attitude.

3. The method of claim 1 further comprising:
an actual fuel surface in a compartment being non-planar; and
displaying fluid related quantities on a display device.

4. The method of claim 1, wherein the moveable platform comprises an aircraft and reducing an error, caused by fuel sloshing, in an estimation of the fluid plane attitude.

5. The method of claim 1, wherein the moveable platform is selected from the group consisting of: a vehicle, a building, and a boat.

6. The method of claim 1, further comprising program code for displaying fluid related quantities on a display device.

7. A method of estimating a fluid plane attitude common to all fluid compartments independent from each other and in or connected to a moveable platform comprising a first fluid compartment comprising a first fluid level sensor and a second fluid level sensor, and a second fluid compartment comprising a third fluid level sensor and a fourth fluid level sensor, the method comprising:
a processor estimating: the fluid plane attitude common to all fluid compartments, and for each fluid compartment, respectively, a height of a best fit planar fluid surface specific to the fluid compartment, via using inputs consisting of: respectively for each fluid level sensor: a fluid height measurement, a location of the fluid level sensor, and the fluid compartment containing the fluid level sensor, and solving a system of equations modeling all fluid height measurements, from the fluid level sensors at their respective locations, lying on the best fit planar fluid surface specific to the fluid compartment containing the fluid level sensor, via a first least square fit of a state vector formed from the system of equations and comprising an estimate of a fluid plane pitch common to all fluid compartments and a fluid plane roll common to all fluid compartments; and
deriving from the fluid plane attitude common to all fluid compartments, at least one of: a cross check on measurements of an attitude of the moveable platform, or minimizing errors in measuring a mass or a volume of fluid in all fluid compartments on the moveable platform and thus reducing fluid margins required for performing a mission with the moveable platform.

8. The method of claim 7, further comprising:
identifying, using a residual from the first least square fit, an outlier among the inputs;
performing a second least square fit on a second state vector formed from a system of equations formed from all the inputs minus the outlier among the inputs.

9. The method of claim 7 further comprising:
identifying, using a residual from the first least square fit, an outlier among the inputs;
performing a redundancy check on all fluid level sensors, except a fluid level sensor associated with the outlier among the inputs, supplying fluid level measurements;
performing a linearity check on all fluid level sensors, except the fluid level sensor associated with the outlier among the inputs, supplying fluid level measurements;

responsive to a successful redundancy check and a successful linearity check, performing a second least square fit on a second state vector formed from the system of equations formed from all the inputs except an input from the fluid level sensor associated with the outlier among the inputs; and displaying fluid quantities on a display device.

10. The method of claim 9 further comprising:
responsive to the successful redundancy check and the successful linearity check, using the fluid plane pitch and the fluid plane roll determined using the second least square fit to calculate an estimate of fluid stability.

11. The method of claim 9 further comprising
responsive to the successful redundancy check and the successful linearity check, calculating an estimate of a confidence of the fluid plane attitude common to the fluid compartments using the fluid plane pitch and the fluid plane roll determined using the second least square fit.

12. The method of claim 9 further comprising:
responsive to an unsuccessful redundancy check or an unsuccessful linearity check, using the fluid plane pitch and the fluid plane roll determined using the first least square fit to calculate an estimate of fluid stability.

13. The method of claim 9 further comprising:
responsive to an unsuccessful redundancy check or an unsuccessful linearity check, calculating an estimate of a confidence of the fluid plane attitude common to the fluid compartments using the fluid plane pitch and the fluid plane roll determined using the first least square fit.

14. The method of claim 7, wherein the moveable platform comprises an aircraft.

15. The method of claim 7, wherein the moveable platform is selected from the group consisting of: a vehicle, a building, and a boat.

16. A computer configured to estimate a fluid plane attitude common to all fluid compartments independent of each other and disposed in or connected to a moveable platform, such that the computer comprises:
a processor; and
a non-transitory computer-recordable storage medium connected to the processor, such that the non-transitory computer-recordable storage medium stores a program code configured to:
estimate, for a first fluid compartment that comprises a first fluid level sensor and a second fluid level sensor, and a second fluid compartment that comprises a third fluid level sensor and a fourth fluid level sensor, the fluid plane attitude common to all fluid compartments, based upon a system of equations, based upon inputs that consist of: respectively for each fluid level sensor: a fluid height measurement, a location of the fluid level sensor, and the fluid compartment containing the fluid level sensor, that models all fluid height measurements, from the fluid level sensors at their respective locations, located on a best fit planar fluid surface specific to the fluid compartment that contains the fluid level sensor; and
derive from the fluid plane attitude common to all fluid compartments, at least one of: a cross check on measurements of an attitude of the moveable platform, or a minimization of errors in a measurement of a mass or a volume of fluid in all fluid compartments on the moveable platform and thus reduction of fluid margins required for performance of a mission with the moveable platform.

17. The computer of claim 16, wherein:
the program code is further configured to estimate for each fluid compartment, respectively, a height of the best fit planar fluid surface specific to the fluid compartment.

18. A computer that comprises:
a processor; and
a non-transitory computer-recordable storage medium storing a program code configured to:
estimate, for fluid compartments independent of each other and disposed in or connected to a moveable platform that comprises a first fluid compartment that comprises a first fluid level sensor and a second fluid level sensor, and a second fluid compartment that comprises a third fluid level sensor and a fourth fluid level sensor, a fluid plane attitude common to all fluid compartments, based upon a system of equations that models all fluid height measurements, from each fluid level sensor at their respective locations, located on a best fit planar fluid surface specific to the fluid compartment that contains the respective fluid level sensor, based upon:
inputs that consist of: respectively for each fluid level sensor: a fluid height measurement, a location of the fluid level sensor, and the fluid compartment containing the fluid level sensor; and
a first least square fit of a state vector formed from the system of equations and comprises an estimate of a fluid plane pitch common to all fluid compartments and a fluid plane roll common to all fluid compartments; and
derive from the fluid plane attitude common to all fluid compartments, at least one of: a cross check on measurements of an attitude of the moveable platform, or a minimization of errors in a measurement of a mass or a volume of fluid in all fluid compartments on the moveable platform and thus reduction of fluid margins required for performance of a mission with the moveable platform.

19. The computer of claim 18, further comprising the program code configured to:
calculate, based upon a residual from the first least square fit, an outlier among the inputs;
perform a second least square fit on a second state vector formed from a system of equations formed from all the inputs minus the outlier among the inputs.

20. The computer of claim 18, further comprising the program code configured to:
identify, based upon a residual from the first least square fit, an outlier among the inputs;
perform a redundancy check on all fluid level sensors supplying, respectively, the fluid height measurement, except a fluid level sensor associated with the outlier among the inputs;
perform a linearity check on all fluid level sensors supplying, respectively, the fluid height measurement, except the fluid level sensor associated with the outlier among the inputs;
responsive to a successful redundancy check and a successful linearity check, perform a second least square fit on a second state vector formed from a system of equations formed from all the inputs except inputs from the fluid level sensor associated with the outlier among the inputs; and
display results on a display device.

* * * * *